United States Patent
Bai et al.

(10) Patent No.: US 10,336,932 B1
(45) Date of Patent: Jul. 2, 2019

(54) MICRO-NANO COMPOSITE PLUGGING AGENT FOR DRILLING FLUID AND PREPARATION METHOD THEREOF, AND DRILLING FLUID AND USE THEREOF

(71) Applicant: Southwest Petroleum University, Chengdu (CN)

(72) Inventors: Yang Bai, Chengdu (CN); Pingya Luo, Chengdu (CN); Jinsheng Sun, Qingdao (CN); Guancheng Jiang, Beijing (CN); Jiading Deng, Chengdu (CN); Yan Cheng, Chengdu (CN); Guojun Li, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 16/288,721

(22) Filed: Feb. 28, 2019

(30) Foreign Application Priority Data

Jan. 7, 2019 (CN) .......................... 2019 1 0013586

(51) Int. Cl.
*C09K 8/42* (2006.01)

(52) U.S. Cl.
CPC .......... *C09K 8/426* (2013.01); *C09K 2208/08* (2013.01); *C09K 2208/10* (2013.01); *C09K 2208/34* (2013.01)

(58) Field of Classification Search
CPC ................ C09K 8/426; C09K 2208/10; C09K 2208/34; Y10S 507/906
See application file for complete search history.

(56) References Cited

U.S. PATENT DOCUMENTS

| | | | |
|---|---|---|---|
| 8,685,903 B2 * | 4/2014 | Ravi ....................... | C04B 28/02 106/812 |
| 2003/0215476 A1 * | 11/2003 | Cassin ................... | A61K 8/066 424/401 |
| 2012/0015852 A1 * | 1/2012 | Quintero ................ | C09K 8/032 507/112 |

* cited by examiner

*Primary Examiner* — Aiqun Li
(74) *Attorney, Agent, or Firm* — Volpe and Koenig, P.C.

(57) ABSTRACT

The present invention discloses a micro-nano composite plugging agent for drilling fluid, a preparation method of the micro-nano composite plugging agent for drilling fluid, a drilling fluid, and an application thereof. The composite plugging agent contains nanometer calcium carbonate, nanometer zinc oxide whiskers, nanometer emulsified paraffin, a flocculating agent, and a lubricant, wherein in the composite plugging agent, the nanometer calcium carbonate is in 10-36 parts by weight, the nanometer zinc oxide whiskers are in 20-40 parts by weight, the nanometer emulsified paraffin is in 30-70 parts by weight, the flocculating agent is in 1-10 parts by weight, and the lubricant is 5-20 parts by weight.

13 Claims, No Drawings

MICRO-NANO COMPOSITE PLUGGING AGENT FOR DRILLING FLUID AND PREPARATION METHOD THEREOF, AND DRILLING FLUID AND USE THEREOF

CROSS COMPARATIVE TO RELATED APPLICATIONS

The application claims priority to Chinese Application No. 201910013586.8, field on Jan. 7, 2019, entitled "micro-nano composite plugging agent for drilling fluid and preparation method thereof, and drilling fluid and Use thereof", which is specifically and entirely incorporated herein by comparative.

FIELD OF THE INVENTION

The present invention relates to the drilling fluid plugging field, particularly to a micro-nano composite plugging agent for drilling fluid, a preparation method of the micro-nano composite plugging agent for drilling fluid, and an application thereof in drilling fluids.

BACKGROUND OF THE INVENTION

Lost circulation is a phenomenon that various working fluids leak into the formation under pressure difference in various downhole operation processes, including well drilling, well cementation and completion, testing, well reparation, etc. Shale gas is stored in mud shale. Shale formations have developed micro-cracks and pores, most of which are at micro-nano level. In a drilling process, the filtrate of drilling fluid invades into the micro-cracks in mud shale first, the micro-fractures extend and expand quickly under a hydration effect, and develop along the fractures, eventually resulting in damaged mud shale and lost circulation. At present, common plugging agents such as calcium carbonate, asphalt, resin, film former, etc. are difficult to enter into the fractures owing to their large particle size and shape mismatch with the fractures, resulting in an unsatisfactory plugging effect. Owing to the advantages of small particle size, high dispersity and good stability, nano-materials can effectively enter into micro-nano-scale fractures and pores for effective plugging, form a dense plugging layer to prevent further invasion of the liquid phase and thereby attain the purpose of plugging. However, conventional nano-plugging materials are rare. In addition, with conventional nano-plugging materials, an agglomeration phenomenon may easily occur owing to the small particle size and high surface activity. As a result, the particle size is increased, and an expected plugging effect can't be achieved.

Therefore, there is an urgent need for an innovative micro-nano plugging agent in the art to solve the problem of lost circulation in shale formations.

SUMMARY OF THE INVENTION

To solve the problem of lost circulation in shale formations in the art, the present invention provides a micro-nano composite plugging agent for drilling fluid, a preparation method of the micro-nano composite plugging agent for drilling fluid, a drilling fluid and an application thereof. The composite plugging agent prepared according to the present invention is highly temperature-resistant, highly universal, and can cope with most lost circulation situations.

To attain the above object, in a first aspect, the present invention provides a micro-nano composite plugging agent for drilling fluid, which contains nanometer calcium carbonate, nanometer zinc oxide whiskers, nanometer emulsified paraffin, a flocculating agent, and a lubricant, wherein, in the composite plugging agent, the nanometer calcium carbonate is in 10-36 parts be weight, the nanometer zinc oxide whiskers are in 20-40 parts by weight, the nanometer emulsified paraffin is in 30-70 parts by weight, the flocculating agent is in 1-10 parts by weight, and the lubricant is in 5-20 parts by weight.

In a second aspect, the present invention provides a method for preparing the composite plugging agent described above, which comprises: mixing the nanometer calcium carbonate, the nanometer zinc oxide whiskers, the nanometer emulsified paraffin, the flocculating agent, and the lubricant sequentially while stirring.

In a third aspect, the present invention provides a drilling fluid, which contains the composite plugging agent described above or a composite plugging agent prepared with the method described above.

In a fourth aspect, the present invention provides an application of the above-mentioned drilling fluid in a formation where a narrow safe density window is encountered during drilling.

With the technical scheme described above, the present invention uses nanometer calcium carbonate, nanometer zinc oxide whiskers, nanometer emulsified paraffin, a flocculating agent, and a lubricant in combination, so that solid particles in larger particle sizes in the composite plugging agent keep fractures in an open state, while solid particles in smaller particle sizes and deformable particles build up spatial structures at the fractures, thereby an isolating layer with very low permeability is formed, and effectively isolates the well bore from the formation and prevent the drilling fluid from leaking into the formation; the composite plugging agent provided in the present invention can extend the usable density range of the drilling fluid and attain a good plugging effect quickly when it is used in a formation where a narrow safe density window is encountered during drilling.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provides a micro-nano composite plugging agent for drilling fluid, which contains nanometer calcium carbonate, nanometer zinc oxide whiskers, nanometer emulsified paraffin, a flocculating agent, and a lubricant, wherein, in the composite plugging agent, the nanometer calcium carbonate is in 10-36 parts by weight, the nanometer zinc oxide whiskers are in 20-40 parts by weight, the nanometer emulsified paraffin is in 30-70 parts by weight, the flocculating agent is in 1-10 parts by weight, and the lubricant is in 5-20 parts by weight.

According to the present invention, the composite plugging agent can attain the object of the present invention to some extent, as long as it contains the nanometer calcium carbonate, the nanometer zinc oxide whiskers, the nanometer emulsified paraffin, the flocculating agent, and the lubricant, and those components are in line with the above-mentioned proportional relation.

The inventor of the present invention has found in the research: though the composite plugging agent can attain the object of the present invention as long as it contains the nanometer calcium carbonate, the nanometer zinc oxide whiskers, the nanometer emulsified paraffin, the flocculating agent, and the lubricant, and those components are in line with the above-mentioned proportional relation, preferably, in the composite plugging agent, the nanometer calcium carbonate is in 18-22 parts by weight, the nanometer zinc oxide whiskers are in 32-34 parts by weight, the nanometer emulsified paraffin is in 52-54 parts by weight, the flocculating agent is in 3-5 parts by weight, and the lubricant is in 7-9 parts by weight; in that case, the plugging effect is the best.

In the present invention, the sum of the contents of the components in the composite plugging agent is 100 parts by weight.

According to the present invention, the drilling fluid is a drilling fluid for field operation.

According to the present invention, the nanometer calcium carbonate is spherical white powder in 20-30 nm average particle diameter, preferably in 22-28 nm average particle diameter; in the present invention, the nanometer calcium carbonate particles may be referred to as small-size solid particles or rigid particles, and can build up spatial structures at fractures.

According to the present invention, the nanometer zinc oxide whiskers are in a slender needled shape in 100-150 nm average length, preferably in 120-130 nm average length; in the present invention, the nanometer zinc oxide whiskers may be referred to as large-size solid particles, which can keep fractures in an open state. The nanometer zinc oxide whiskers are connected with each other and form irregular spatial structures after they are added into a drilling fluid.

According to the present invention, the nanometer emulsified paraffin is in a spherical shape at normal temperature, and has a 50° C. softening point, and the average particle diameter of the nanometer emulsified paraffin is 10-15 nm, preferably is 11-13 nm; and in the present invention, the nanometer emulsified paraffin is deformable, and may be referred to as deformable particles; they can build up spatial structures in fractures.

According to the present invention, the flocculating agent is polyacrylamide, and is white powder in 25-80 μm average particle diameter, preferably in 30-60 μm average particle diameter.

According to the present invention, the lubricant is sulfonated bitumen, and is brown powder in 30-60 nm average particle diameter, preferably in 40-50 nm average particle diameter.

In a second aspect, the present invention provides a method for preparing the composite plugging agent according to the present invention, which comprises: mixing the nanometer calcium carbonate, the nanometer zinc oxide whiskers, the nanometer emulsified paraffin, the flocculating agent, and the lubricant sequentially while stirring.

According to the present invention, the stirring condition includes: 1,000-2,000 rpm stirring rate, preferably 1,400-1,500 rpm stirring rate.

In a third aspect, the present invention provides a drilling fluid, which contains the composite plugging agent described above or a composite plugging agent prepared with the method described above.

According to the present invention, with respect to 100 mL drilling fluid, the dose of the composite plugging agent may comprise: 10-36 parts by weight nanometer calcium carbonate, 20-40 parts by weight nanometer zinc oxide whiskers, 30-70 parts by weight nanometer emulsified paraffin, 1-10 parts by weight flocculating agent, and 5-20 parts by weight lubricant; preferably, with respect to 100 mL drilling fluid, the dose of the composite plugging agent may comprise: 18-22 parts by weight nanometer calcium carbonate, 32-34 parts by weight nanometer zinc oxide whiskers, 52-54 parts by weight nanometer emulsified paraffin, 3-5 parts by weight flocculating agent, and 7-9 parts by weight lubricant.

In a fourth aspect, the present invention provides an application of the drilling fluid according to the present invention in a formation where a narrow safe density window is encountered during drilling.

According to the present invention, it should be noted that the "density window" refers to the density range of drilling fluid. A "narrow density window" means that the usable density range of the drilling fluid is very narrow in the drilling process of a formation. In the case of a "narrow density window", complex drilling situations may occur. For example, lost circulation may occur easily if the density of the drilling fluid is above the range, or borehole wall sloughing and scaling may occur easily if the density of the drilling fluid is below the range. In the present invention, when the drilling fluid provided in the present invention is applied to a formation where a narrow safe density window is encountered, the composite plugging agent provided in the present invention can extend the "narrow density window", which is to say, the usable density range of the drilling fluid can be extended in the drilling process of the formation. Therefore, the composite plugging agent provided in the present invention can solve various lost circulation problems.

With the above technical scheme, the composite plugging agent provided in the present invention can attain an effective plugging effect quickly; specifically, solid particles in larger particle diameters in the composite plugging agent keep fractures in an open state, solid particles in smaller particle sizes and deformable particles build up spatial structures at the fractures, thereby an isolating layer with very low permeability is formed, and effectively isolates the well bore from the formation and prevents the drilling fluid from leaking into the formation. The composite plugging agent provided in the present invention can attain a good plugging effect quickly when it is applied to a formation where a narrow safe density window is encountered.

Hereunder the present invention will be detailed in embodiments.

In the following embodiments of the present invention, the nanometer calcium carbonate is Model HXNM-200 from Qingyuan Chemicals Co., Ltd.; the nanometer zinc oxide whiskers are Model PZT-15 from Nanjing Paukert Advanced Material Co., Ltd.; the nanometer emulsified paraffin is from Beijing DK Nano Technology Co., Ltd; the polyacrylamide is Model PAM from Renqiu Guanghui Chemicals Co., Ltd.; the sulfonated bitumen is Model LQ-G001 from Zhengzhou Jinhuo High-Temperature Materials Co., Ltd.

The average particle diameter is tested with a laser particle size analyzer Model Mastr sizer 2000 from the company Malvern Panalytical in English.

The average length is tested with a SEM Model ZEISSEVOMA15 from Carl Zeiss Microscopic Imaging Co., Ltd.

Example 1

This example is provided to describe the composite plugging agent and the preparation method thereof in the present invention.

20 parts by weight nanometer calcium carbonate in 25 nm average particle diameter, 33 parts by weight nanometer zinc oxide whiskers in 125 nm average length, 53 parts by weight nanometer emulsified paraffin in 12 nm average particle diameter, 4 parts by weight polyacrylamide in 50 μm average particle diameter, and 8 parts by weight sulfonated bitumen in 45 nm average particle diameter are loaded into an agitator and mixed to a homogeneous state at normal temperature and normal pressure at 1,400 rpm agitating rate; thus, a composite plugging agent A1 is obtained. The performance test data of the composite plugging agent is shown in Table 1.

Example 2

This example is provided to describe the composite plugging agent and the preparation method thereof in the present invention.

18 parts by weight nanometer calcium carbonate in 22 nm average particle diameter, 32 parts by weight nanometer zinc oxide whiskers in 120 nm average length, 52 parts by weight nanometer emulsified paraffin in 11 nm average particle diameter, 3 parts by weight polyacrylamide in 30 μm average particle diameter, and 7 parts by weight sulfonated bitumen in 40 nm average particle diameter are loaded into an agitator and mixed to a homogeneous state at normal temperature and normal pressure at 1,400 rpm agitating rate; thus, a composite plugging agent A2 is obtained. The performance test data of the composite plugging agent is shown in Table 1.

Example 3

This example is provided to describe the composite plugging agent and the preparation method thereof in the present invention.

22 parts by weight nanometer calcium carbonate in 28 nm average particle diameter, 34 parts by weight nanometer zinc oxide whiskers in 130 nm average length, 54 parts by weight nanometer emulsified paraffin in 13 nm average particle diameter, 5 parts by weight polyacrylamide in 60 μm average particle diameter, and 9 parts by weight sulfonated bitumen in 50 nm average particle diameter are loaded into an agitator and mixed to a homogeneous state at normal temperature and normal pressure at 1,400 rpm agitating rate; thus, a composite plugging agent A3 is obtained. The performance test data of the composite plugging agent is shown in Table 1.

Example 4

This example is provided to describe the composite plugging agent and the preparation method thereof in the present invention.

A composite plugging agent is prepared with the preparation method described in the example 1, except for the following difference: 10 parts by weight nanometer calcium carbonate in 20 nm average particle diameter, 20 parts by weight nanometer zinc oxide whiskers in 100 nm average length, 70 parts by weight nanometer emulsified paraffin in 10 nm average particle diameter, 1 parts by weight polyacrylamide in 25 μm average particle diameter, and 5 parts by weight sulfonated bitumen in 30 nm average particle diameter are loaded into an agitator and mixed to a homogeneous state at normal temperature and normal pressure at 1,400 rpm agitating rate; thus, a composite plugging agent A4 is obtained. The performance test data of the composite plugging agent is shown in Table 1.

Example 5

This example is provided to describe the composite plugging agent and the preparation method thereof in the present invention.

36 parts by weight nanometer calcium carbonate in 30 nm average particle diameter, 40 parts by weight nanometer zinc oxide whiskers in 150 nm average length, 30 parts by weight nanometer emulsified paraffin in 15 nm average particle diameter, 10 parts by weight polyacrylamide in 80 μm average particle diameter, and 20 parts by weight sulfonated bitumen in 60 nm average particle diameter are loaded into an agitator and mixed to a homogeneous state at normal temperature and normal pressure at 1,400 rpm agitating rate; thus, a composite plugging agent A5 is obtained. The performance test data of the composite plugging agent is shown in Table 1.

Comparative Example 1

A fracture arresting agent is prepared with the preparation method described in the example 1, except for the following difference: 8 parts by weight nanometer calcium carbonate, 18 parts by weight nanometer zinc oxide whiskers, 75 parts by weight nanometer emulsified paraffin, 0.5 parts by weight polyacrylamide, and 4 parts by weight sulfonated bitumen are loaded into an agitator and mixed to a homogeneous state at normal temperature and normal pressure at 1,400 rpm agitating rate; thus, a composite plugging agent D1 is obtained. The performance test data of the composite plugging agent is shown in Table 1.

Comparative Example 2

A fracture arresting agent is prepared with the preparation method described in the example 1, except for the following difference: 40 parts by weight nanometer calcium carbonate, 45 parts by weight nanometer zinc oxide whiskers, parts by weight nanometer emulsified paraffin, 5 parts by weight polyacrylamide, and 15 parts by weight sulfonated bitumen are loaded into an agitator and mixed to a homogeneous state at normal temperature and normal pressure at 1,400 rpm agitating rate; thus, a composite plugging agent D2 is obtained. The performance test data of the composite plugging agent is shown in Table 1.

Comparative Example 3

A fracture arresting agent is prepared with the preparation method described in the example 1, except for the following difference: the average particle diameter of the nanometer calcium carbonate is 50 nm, the average length of the nanometer zinc oxide whiskers is 180 nm, the average particle diameter of the nanometer emulsified paraffin is 8 nm, the average particle diameter of the polyacrylamide is 20 μm, and the average particle diameter of the sulfonated bitumen is 25 nm; those materials are loaded into an agitator and mixed to a homogeneous state at normal temperature and normal pressure at 1,400 rpm agitating rate; thus, a composite plugging agent D3 is obtained. The performance test data of the composite plugging agent is shown in Table 1.

Comparative Example 4

A fracture arresting agent is prepared with the preparation method described in the example 1, except for the following difference: the nanometer zinc oxide whiskers are omitted; thus, a composite plugging agent D4 is obtained. The performance test data of the composite plugging agent is shown in Table 1.

Comparative Example 5

A fracture arresting agent is prepared with the preparation method described in the example 1, except for the following difference: the nanometer emulsified paraffin is omitted; thus, a composite plugging agent D5 is obtained. The performance test data of the composite plugging agent is shown in Table 1.

Comparative Example 6

A fracture arresting agent is prepared with the preparation method described in the example 1, except for the following difference: the nanometer calcium carbonate and the flocculating agent are omitted; thus, a composite plugging agent D6 is obtained. The performance test data of the composite plugging agent is shown in Table 1.

Test Cases 30-mesh quartz sand is filled in a tubular instrument in 25 cm length to simulate a porous formation, then the composite plugging agents A1-A5 prepared in the examples 1-5 and the composite plugging agents D1-D6 prepared in the comparative examples 1-6 are added in 200 mL volume respectively into the testing instrument, and the quartz sand layer is squeezed by charging nitrogen to simulate a situation that the downhole drilling fluid is squeezed into the well wall. The results are shown in Table 1.

TABLE 1

| Drilling Fluid | 7.5 min | 30 min |
|---|---|---|
| A1 | Invasion amount: about 9 mL, invasion depth: 0.3 cm | Invasion amount: 13 mL, invasion depth: 0.7 cm |
| A2 | Invasion amount: about 10 mL, invasion depth: 0.3 cm | Invasion amount: 14 mL, invasion depth: 0.7 cm |
| A3 | Invasion amount: about 10 mL, invasion depth: 0.3 cm | Invasion amount: 15 mL, invasion depth: 0.7 cm |
| A4 | Invasion amount: about 12 mL, invasion depth: 0.4 cm | Invasion amount: 17 mL, invasion depth: 0.8 cm |
| A5 | Invasion amount: about 15 mL, invasion depth: 0.5 cm | Invasion amount: 19 mL, invasion depth: 0.9 cm |
| D1 | Invasion amount: about 122 mL, invasion depth: 11 cm | Invasion amount: 183 mL, invasion depth: 16 cm |
| D2 | Invasion amount: about 136 mL, invasion depth: 15 cm | Invasion amount: 192 mL, invasion depth: 19 cm |
| D3 | Invasion amount: about 125 mL, invasion depth: 14 cm | Invasion amount: 185 mL, invasion depth: 17 cm |
| D4 | Invasion amount: about 123 mL, invasion depth: 12 cm | Invasion amount: 182 mL, invasion depth: 16 cm |
| D5 | Invasion amount: about 188 mL, invasion depth: 19 cm | Invasion amount: 200 mL, invasion depth: 25 cm |
| D6 | Invasion amount: about 192 mL, invasion depth: 21 cm | Invasion amount: 200 mL, invasion depth: 25 cm |

It is seen from the data in Table 1: the composite plugging agents A1-A5 invade into the quartz sand layer with a depth not greater than 1 cm, while the composite plugging agents D1-D6 invade into the quartz sand layer with a depth greater than 10 cm. That proves the composite plugging agent provided in the present invention has excellent plugging performance.

Test Case 2

Drilling fluids containing the composite plugging agents A1-A5 prepared in the examples 1-5 and drilling fluids containing the composite plugging agents D1-D6 prepared in the comparative examples 1-6 are applied in 150 mL volume respectively to a formation where a narrow safe density window is encountered, to plug a 2 mm*1.5 mm fracture, i.e., a DL-type plugging experiment is carried out at normal temperature. The results are shown in Table 2.

TABLE 2

| Drilling Fluid | Leakage (mL) | Phenomenon in experiment |
|---|---|---|
| A1 | 3 | The drilling fluid is lost in droplets, and no further loss of drilling fluid starting from 1 min after the pressure becomes stable. |
| A2 | 4 | The drilling fluid is lost in droplets, and no further loss of drilling fluid starting from 2 min after the pressure becomes stable. |
| A3 | 5 | The drilling fluid is lost in droplets, and no further loss of drilling fluid starting from 3 min after the pressure becomes stable. |
| A4 | 8 | The drilling fluid is lost in droplets, and no further loss of drilling fluid starting from 6 min after the pressure becomes stable. |
| A5 | 7 | The drilling fluid is lost in droplets, and no further loss of drilling fluid starting from 5 min after the pressure becomes stable. |
| D1 | 125 | The drilling fluid flows in a linear stream form for 3 min first, then flows in droplets, and the flow is stopped after 23s. There is no loss of drilling fluid anymore starting from 1 min after the pressure becomes stable. |
| D2 | 150 | The drilling fluid flows in a linear stream form for 5 min and 33s first, then flows in droplets, and the flow is stopped after 15s. There is no loss of drilling fluid anymore starting from 2 min after the pressure becomes stable. |
| D3 | 80 | The drilling fluid flows in a linear stream form for 1 min first, then flows in droplets, and the flow is stopped after 20s. There is no loss of drilling fluid anymore starting from 2 min after the pressure becomes stable. |
| D4 | 92 | The drilling fluid flows in a linear stream form for 1 min and 20s first, then flows in droplets, and the flow is stopped after 1 min. There is no loss of drilling fluid anymore starting from 3 min after the pressure becomes stable. |
| D5 | 65 | The drilling fluid flows in a linear stream form for 30s first, then flows in droplets, and the flow is stopped after 2 min. There is no loss of drilling fluid anymore starting from 3 min after the pressure becomes stable. |
| D6 | 79 | The drilling fluid flows in a linear stream form for 1 min first, then flows in droplets, and the flow is stopped after 20 min. There is no loss of drilling fluid anymore starting from 3 min after the pressure becomes stable. |

It is seen from the data in Table 2: when the drilling fluid provided in the present invention is applied to a formation where a narrow safe density window is encountered, the composite plugging agent provided in the present invention can extend the "narrow density window", which is to say, the usable density range of the drilling fluid can be extended in the drilling process of the formation. Therefore, the composite plugging agent provided in the present invention can solve various lost circulation problems.

While the present invention is described above in detail in preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

What is claimed is:

1. A micro-nano composite plugging agent for drilling fluid,
containing nanometer calcium carbonate, nanometer zinc oxide whiskers, nanometer emulsified paraffin, a flocculating agent, and a lubricant, wherein in the composite plugging agent, the nanometer calcium carbonate is in 10-36 parts by weight, the nanometer zinc oxide whiskers are in 20-40 parts by weight, the nanometer emulsified paraffin is in 30-70 parts by weight, the flocculating agent is in 1-10 parts by weight, and the lubricant is in 5-20 parts by weight.

2. The micro-nano composite plugging agent according to claim 1, wherein in the composite plugging agent, the nanometer calcium carbonate is in 18-22 parts by weight, the nanometer zinc oxide whiskers are in 32-34 parts by weight, the nanometer emulsified paraffin is in 52-54 parts by weight, the flocculating agent is in 3-5 parts by weight, and the lubricant is in 7-9 parts by weight.

3. The micro-nano composite plugging agent according to claim 1, wherein the nanometer calcium carbonate is spherical white powder in 20-30 nm average particle diameter.

4. The micro-nano composite plugging agent according to claim 3, wherein the nanometer calcium carbonate is in 22-28 nm average particle diameter.

5. The micro-nano composite plugging agent according to claim 1, wherein the nanometer zinc oxide whiskers are in a slender needled shape in 100-150 nm average length.

6. The micro-nano composite plugging agent according to claim 5, wherein the nanometer zinc oxide whiskers are in a slender needled shape in 120-130 nm average length.

7. The micro-nano composite plugging agent according to claim 1, wherein the nanometer emulsified paraffin is in a spherical shape at normal temperature, and the average particle diameter of the nanometer emulsified paraffin is 10-15 nm.

8. The micro-nano composite plugging agent according to claim 7, wherein the average particle diameter of the nanometer emulsified paraffin is 11-13 nm.

9. The micro-nano composite plugging agent according to claim 1, wherein the flocculating agent is polyacrylamide powder in 25-80 μm average particle diameter.

10. The micro-nano composite plugging agent according to claim 9, wherein the the flocculating agent is in 30-60 μm average particle diameter.

11. The micro-nano composite plugging agent according to claim 1, wherein the lubricant is sulfonated bitumen powder in 30-60 nm average particle diameter.

12. The micro-nano composite plugging agent according to claim 11, wherein the lubricant is in 40-50 nm average particle diameter.

13. A method for preparing the micro-nano composite plugging agent according to claim 1, comprising: mixing the nanometer calcium carbonate, the nanometer zinc oxide whiskers, the nanometer emulsified paraffin, the flocculating agent, and the lubricant sequentially while stirring.

* * * * *